US011415058B2

(12) United States Patent
Ryon et al.

(10) Patent No.: US 11,415,058 B2
(45) Date of Patent: Aug. 16, 2022

(54) TORCH IGNITORS WITH TANGENTIAL INJECTION

(71) Applicant: Delavan Inc., West Des Moines, IA (US)

(72) Inventors: Jason Ryon, Carlisle, IA (US); Lev A. Prociw, Johnston, IA (US); Brandon Phillip Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/133,161

(22) Filed: Dec. 23, 2020

(65) Prior Publication Data
US 2022/0195938 A1 Jun. 23, 2022

(51) Int. Cl.
| | | |
|---|---|---|
| F02C 7/264 | (2006.01) | |
| F23R 3/16 | (2006.01) | |
| F23R 3/04 | (2006.01) | |
| F23R 3/34 | (2006.01) | |

(52) U.S. Cl.
CPC ............. *F02C 7/264* (2013.01); *F23R 3/045* (2013.01); *F23R 3/16* (2013.01); *F23R 3/343* (2013.01); *F05D 2220/323* (2013.01)

(58) Field of Classification Search
CPC .. F02C 7/264; F02C 7/266; F02C 3/04; F23R 3/045; F23R 3/16; F23R 3/343; F23R 3/14; F23R 3/20; F23R 3/28; F23R 3/286
See application file for complete search history.

(56) References Cited

U.S. PATENT DOCUMENTS

| | | | |
|---|---|---|---|
| 2,645,082 A | 7/1953 | Sarto | |
| 3,691,766 A * | 9/1972 | Champion | F02C 7/264 |
| | | | 60/39.826 |
| 4,112,675 A | 9/1978 | Pillsbury et al. | |
| 4,192,139 A | 3/1980 | Buchheim | |
| 4,194,358 A | 3/1980 | Stenger | |

(Continued)

FOREIGN PATENT DOCUMENTS

GB 627722 A 8/1949

OTHER PUBLICATIONS

Extended European Search Report dated May 17, 2022, issued during the prosecution of European Patent Application No. EP 21216022.0.

*Primary Examiner* — Craig Kim
(74) *Attorney, Agent, or Firm* — Locke Lord LLP; Joshua L. Jones; Scott D. Wofsy

(57) ABSTRACT

An embodiment of a torch ignitor system for a combustor of a gas turbine engine includes a torch ignitor, the torch ignitor include a combustion chamber oriented about a torch axis, the combustion chamber having axially upstream and downstream ends defining a flow direction through the combustion chamber, along the axis. The torch ignitor further includes a tip at a downstream end of the elbow for issuing the injection of combustion products. An embodiment of a method includes initiating combustion in a combustion chamber of a torch ignitor to produce an ignition jet flame extending along an ignition jet flame axis, and igniting a fuel/air mixture in a gas turbine combustor by issuing a respective spray cone of the fuel/air mixture from a respective fuel injectors in a plurality of fuel injectors, wherein the ignition jet flame axis intersects a plurality of the spray cones.

19 Claims, 4 Drawing Sheets

(56) References Cited

U.S. PATENT DOCUMENTS

| | | | |
|---|---|---|---|
| 4,860,533 A | | 8/1989 | Joshi |
| 5,027,603 A | * | 7/1991 | Shekleton ................. F02C 7/26 |
| | | | 60/743 |
| 6,912,857 B2 | * | 7/2005 | Schmotolocha ........ F23Q 13/00 |
| | | | 431/263 |
| 8,863,495 B2 | | 10/2014 | Ikeda |
| 2004/0168442 A1 | | 9/2004 | Schmotolocha et al. |
| 2004/0226298 A1 | * | 11/2004 | Snyder ..................... F02K 3/10 |
| | | | 60/761 |
| 2005/0053876 A1 | | 3/2005 | Joos et al. |
| 2007/0107437 A1 | * | 5/2007 | Evulet .................... F23R 3/286 |
| | | | 60/776 |
| 2014/0060063 A1 | | 3/2014 | Boardman et al. |
| 2014/0366551 A1 | * | 12/2014 | Prociw ..................... F23R 3/28 |
| | | | 60/776 |
| 2015/0020501 A1 | | 1/2015 | Bourgois et al. |
| 2018/0003388 A1 | | 1/2018 | Park |
| 2019/0010872 A1 | * | 1/2019 | Dam ........................ F23R 3/34 |
| 2019/0010873 A1 | | 1/2019 | Dam et al. |
| 2019/0017441 A1 | | 1/2019 | Venkatesan et al. |
| 2020/0309378 A1 | * | 10/2020 | Dam ........................ F23R 3/14 |
| 2021/0215100 A1 | | 7/2021 | Head et al. |

\* cited by examiner

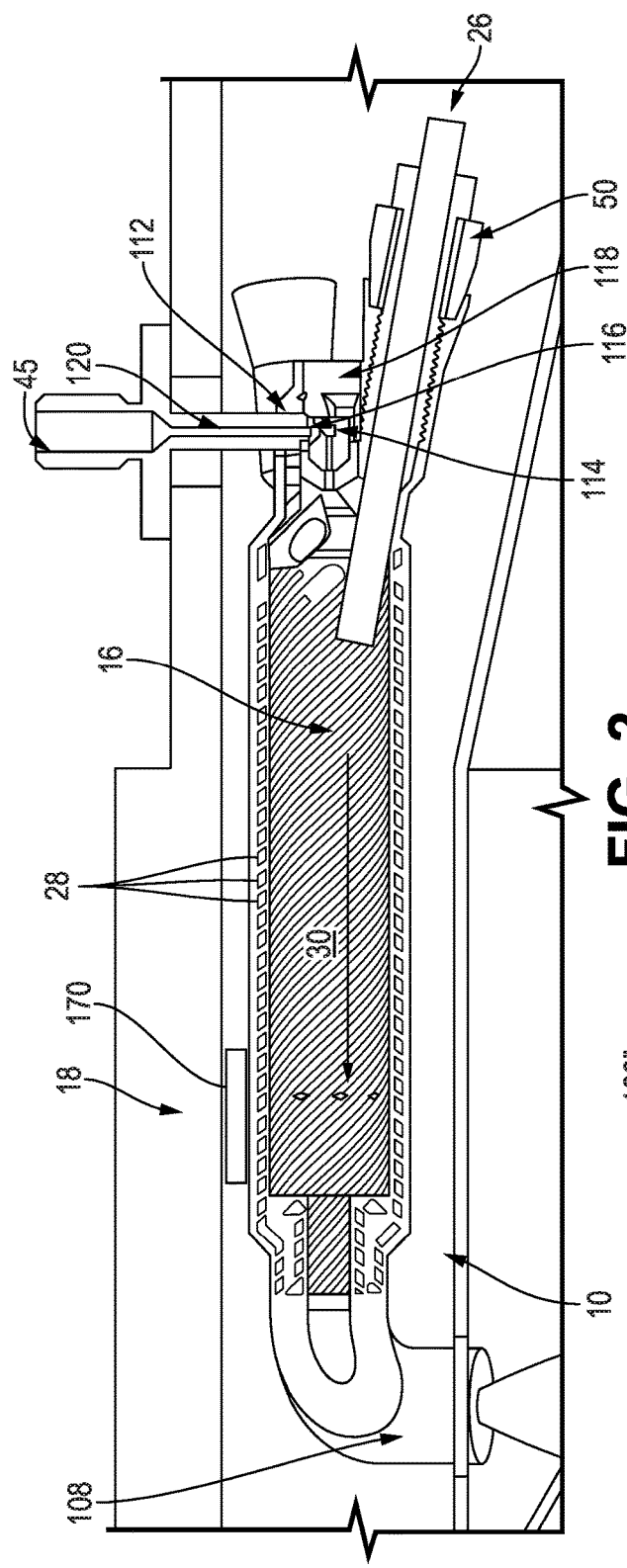
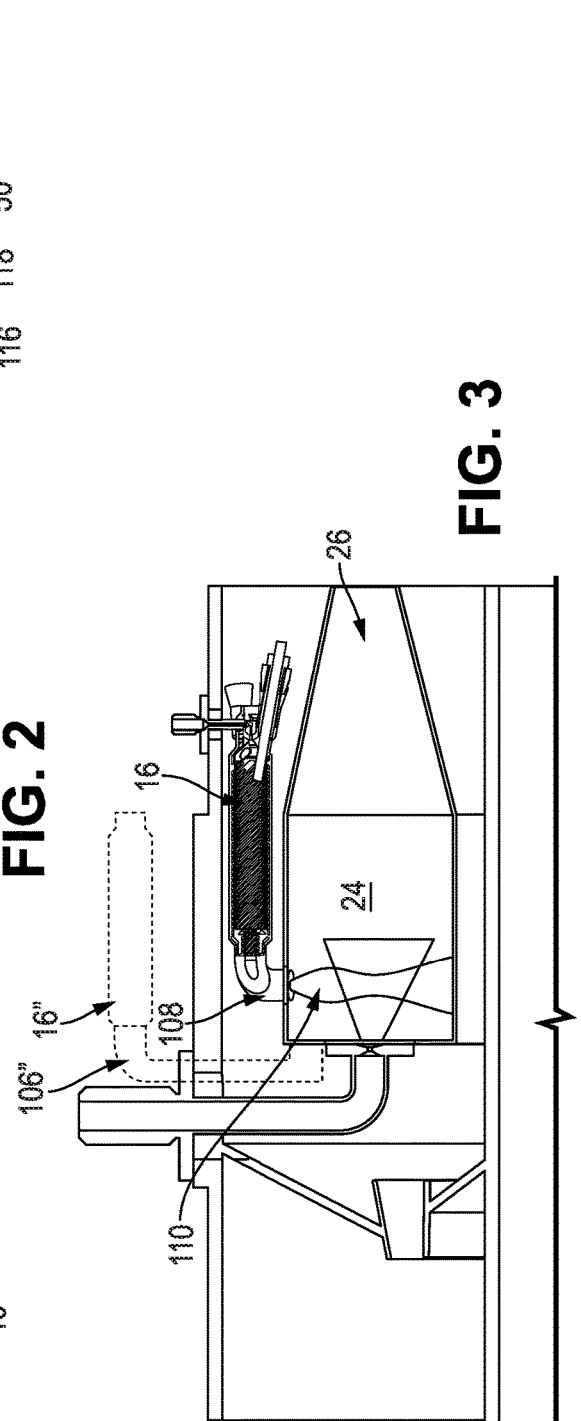
FIG. 2
FIG. 3

TORCH IGNITORS WITH TANGENTIAL INJECTION

BACKGROUND

The present disclosure relates to gas turbine engines and, more particularly, to torch ignitors and methods suitable for use in torch ignitors used in the combustor section of a gas turbine engine.

Torch ignitors can be used in lieu of spark ignitors to provide an ignition source for combustors located in gas turbine engines. Torch ignitors provide a flame to the combustion chamber of a gas turbine engine as an ignition source rather than the electric current provided by spark ignitors. Consequently, torch ignitors can provide a larger target for main fuel injectors within the combustor, allowing for utilization of a greater range of fuel injector designs. Torch ignitors are intended to remain active while the gas turbine is operating. Moreover, torch ignition of a single main combustor fuel nozzles is useful but there remains a need for the ability of a single torch ignitor that aids in lighting multiple main fuel nozzles.

SUMMARY

A torch ignitor system for a combustor of a gas turbine engine includes a torch ignitor, the torch ignitor comprising a combustion chamber oriented about a torch axis, the combustion chamber having axially upstream and downstream ends defining a flow direction through the combustion chamber, along the axis. The torch ignitor also includes a cap defining the axially upstream end of the combustion chamber and oriented about the axis, wherein the cap is configured to receive a fuel injector and at least one glow plug. The torch ignitor further includes an elbow connected to the downstream end of the combustion chamber for diverting flame along an ignition jet flame axis that is off of the torch axis for tangential injection of flame into a gas turbine engine combustor; and a tip at a downstream end of the elbow for issuing the tangential injection of flame.

A method includes initiating combustion in a combustion chamber of a torch ignitor to produce an ignition jet flame extending along an ignition jet flame axis, and igniting a fuel/air mixture in a gas turbine combustor by issuing a respective spray cone of the fuel/air mixture from a respective fuel injectors in a plurality of fuel injectors, wherein the ignition jet flame axis intersects a plurality of the spray cones.

BRIEF DESCRIPTION OF THE DRAWINGS

FIG. 2 is an enlarged view of the torch ignitor of FIG. 1.

FIG. 3 is a cross-sectional side elevation view of an example of a torch ignitor having a combustion chamber outside the combustion section of a gas turbine engine.

DETAILED DESCRIPTION

The present disclosure presents structures and methods for starting a torch ignitor suitable for igniting the combustor of a gas turbine engine.

The following are non-exclusive descriptions of possible embodiments of the present disclosure. A small, independent torch ignitor system offers many advantages for gas turbine engines, for example, an independent heat source from the main combustor which can be used to ignite, stabilize, and relight the main combustor. The isolated nature of such a system allows the torch ignitor to be stable regardless of the conditions within the main combustor. Systems and methods disclosed herein allow a single torch ignitor to aid in lighting multiple main fuel nozzles, aiding in the main combustor "light around." By aiming the exhaust of a torch ignitor tangentially relative to the engine central axis so that it's flame and/or exhaust products span across multiple fuel injectors, the present disclosure provides for rapid relight capabilities.

Figure 1:
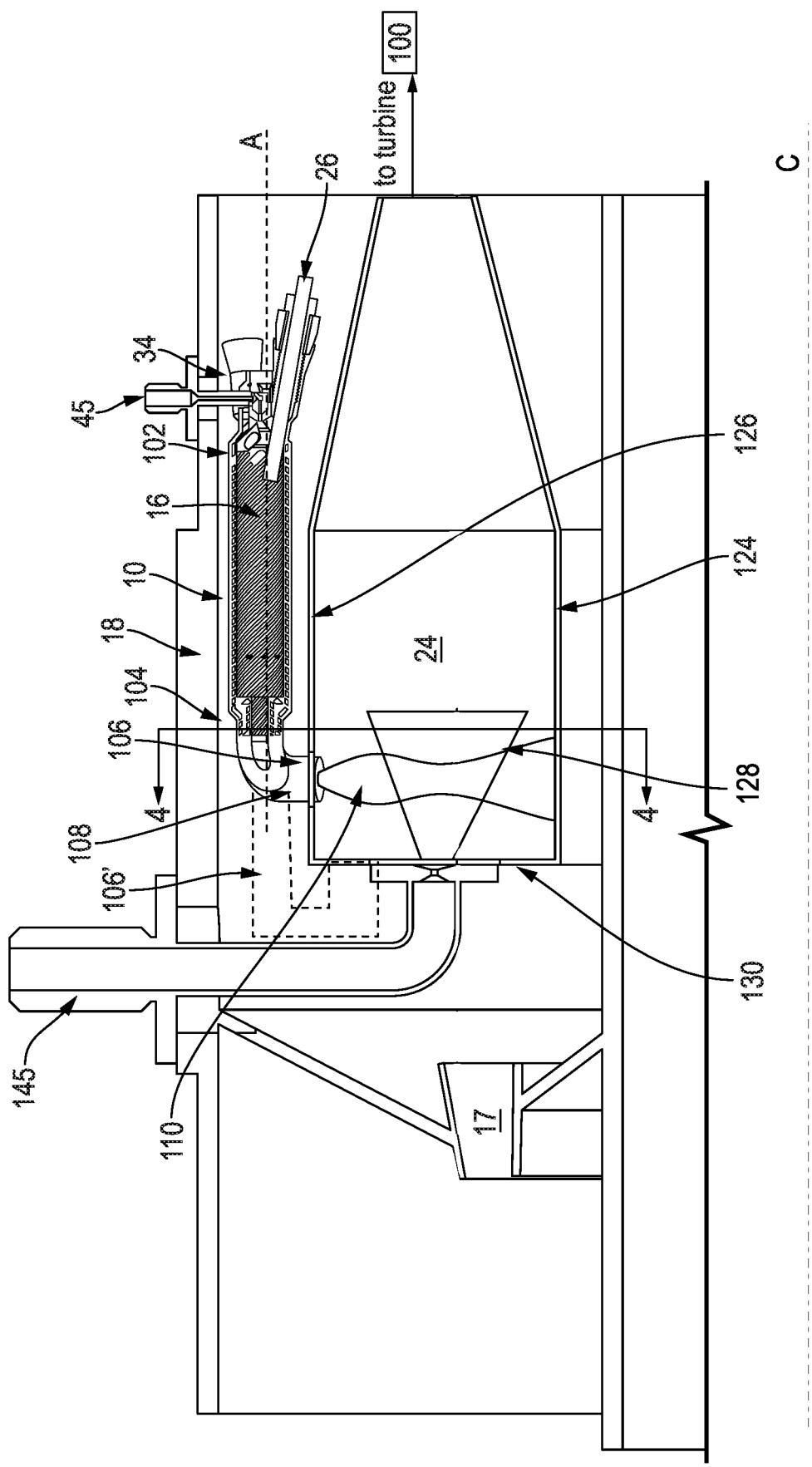
FIG. 1 is a cross-sectional side elevation view of an example of a torch ignitor within the combustion section of a gas turbine engine.

FIG. 1 is a cross sectional view of a torch ignitor 10 for a main combustor 24 of a gas turbine engine 100. The torch ignitor 10 can comprise a combustion chamber 16 oriented about a torch axis A, and the combustion chamber 16 can have axially upstream and downstream ends 102, 104 defining a flow direction through the combustion chamber 16, along the axis A and indicated by the arrow 30 (e.g. as shown in FIG. 2). A cap 34 can define the axially upstream end 102 of the combustion chamber 16 and can also be oriented about the axis A. The cap 34 may be separable from the torch wall 16, or may be formed integrally with the torch wall 16. In the example shown in FIG. 1, the cap 34 can be configured to receive a fuel injector 45 and at least one glow plug 26.

In operation, air enters the high pressure engine case 18 through inlet 17 (e.g. from a main engine compressor). Torch ignitor 10 intakes high pressure air from the inside of high-pressure case 18 via an inlet disposed in the cap 34 of torch ignitor 10. The high-pressure air is channeled through cooling channels 28 to cool a liner of combustion chamber 16 before it is channeled into combustion chamber 16 to be used in combustion within torch ignitor 10 (for example as shown in the enlarged view in FIG. 2). Combustion chamber 16 can be in fluid communication with an internal volume of main combustor 24 via an outlet within the tip 106, allowing combustion products (e.g. flame 110) from torch ignitor 10 to reach the interior of the main combustor 24 and thereby ignite fuel within main combustor 24. The inner wall of combustion chamber 16 is depicted as transparent in FIGS. 1-2 to show the helical structure of cooling channels 28.

Figure 4:
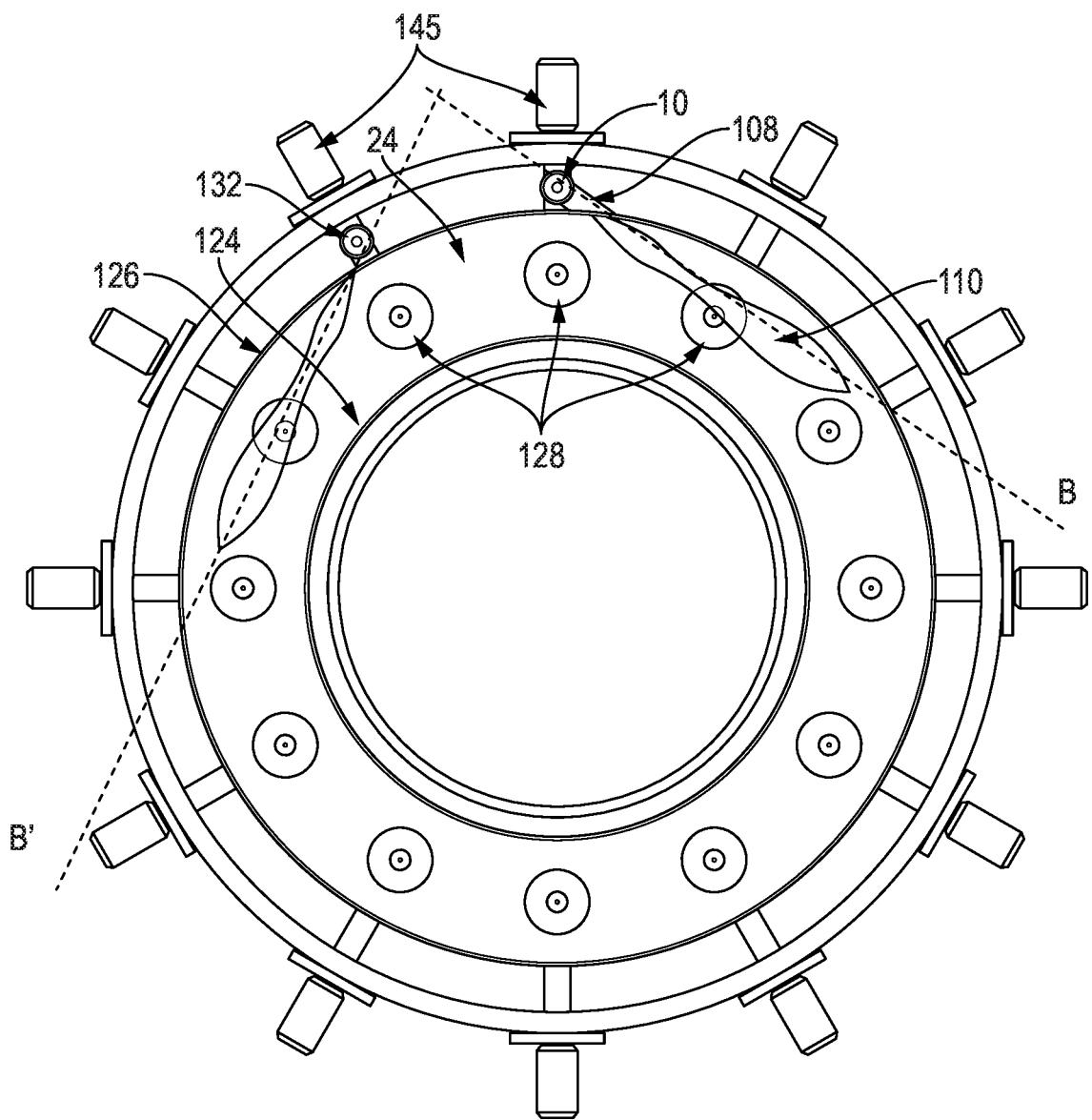
FIG. 4 is a cross-sectional axial end elevation view of a combustion section, showing the torch ignitor of FIG. 1 with a flame axis positioned tangentially to the engine axis in accordance with at least one aspect of this disclosure.

The torch ignitor 10 can include an elbow 108 connected to the downstream end 104 of the combustion chamber 16 for diverting combustion products (e.g. flame 110) along an ignition jet flame axis B (e.g. as shown in FIG. 4). Ignition jet flame axis B can be off of the torch axis A for tangential injection of flame 110 into a gas turbine engine combustor (e.g. main combustor 24), relative to the engine axis C. However, it is possible that the torch ignitor 10 may be mounted to the main combustor in any suitable manner, for example to allow for axial and/or radial injection of flame 110, in addition to tangential injection. The tip 106 can be connected to a downstream end of the elbow 108 for issuing the injection of flame 110 relative to the torch axis A and engine axis C. By including an elbow 108 on torch ignitor 10, the tip 106 of the torch ignitor 10 can be aligned independent of the axis of the combustion chamber 16 of the torch 10, e.g. axis A. This configuration can provide added flexibility as to placement of torch ignitor 10 and its components (e.g., combustion chamber 16), relative to the location and angle of the torch flame 110 that enters into the main combustor 24.

The cap 34 may be mounted to a high pressure engine case 18 (e.g. by brackets 170 or by fuel injector 45) while the tip 106 may be mounted to the main combustor 24 within the high pressure engine case 18. In this way, it is possible for the main combustor 24 to be in fluid communication with the combustion products from the combustion chamber 16, where the combustion products can be formed from fuel and pressurized oxygen containing gas from sources outside the high pressure engine case 18. Additionally or alternatively, the torch ignitor 10 itself may be mounted to the high pressure engine case 18 by support bracket 170 (e.g. shown in FIG. 2), or may be mounted by any other suitable attachment means.

In embodiments, such as the example shown in the enlarged view in FIG. 2, the torch ignitor 10 can include a fuel injector seat 112 defined in the cap 34. The fuel injector seat 112 can be configured to receive the fuel injector 45 and to provide a passage for injecting fuel and air from an external source through the fuel injector 45 and into the combustion chamber 16. It is also possible that the torch ignitor 10 can include at least one glow plug seat 50 defined in the cap 34. The glow plug seat 50 can be comprised of multiple components, such as a housing and sheath, however for the sake of simplicity, the structure will be hereinafter referred to as the glow plug seat 50. The glow plug seat 50 can be configured to receive the glow plug 26 through the cap 34 where the glow plug 26 can extend through the cap 34 and into the combustion chamber 16 to initiate ignition in fuel and air in the combustion chamber 16.

In embodiments, such as the example shown in FIG. 2, the fuel injector 45 can include an air inlet 114 and a separate fuel inlet 116. The cap 34 can include an air passage 118 in fluid communication with the air inlet 114 of the fuel injector 45 and a liquid fuel passage 120 in fluid communication with the fuel inlet 116 of the fuel injector 45 at the upstream end 102 of the combustion chamber 16.

In embodiments, the combustion chamber 16 can be parallel to an engine axis C, while, as described above, the torch can be defined along axis A. The torch axis A and engine axis C can be non-intersecting (e.g. as shown in FIG. 1). In embodiments, the torch axis A and the engine axis C can be parallel. The tip 106 can be connected so as to discharge flame 110 tangentially relative to the engine axis C into the combustor 24 for ignition of a fuel/air mixture in the combustor 24. In operation, the combustion products produced in the combustion chamber 16 can then flow into the main combustor 24, and eventually be used to start the turbine of the gas turbine engine, as indicated by the "to turbine" arrow in FIG. 1.

Torch ignitor 10 can contain its own fuel injector 45 (for example as shown in FIGS. 1-3), while the main combustor 24 may have plurality of main fuel injectors 145 which can be mounted to the main combustor 24 as shown in the example in FIG. 4. It is contemplated that for each torch ignitor 10, the combustion chamber 16 can be outside of the main combustor 24, such as shown in FIGS. 1-4, and at the same time, it is possible that none of the main fuel injectors 145 includes a combustion chamber outside of the main combustor 24. It is also contemplated, for example as shown in broken lines in FIG. 3, that the combustion chamber 16 (e.g. shown as 16") can be external to the high pressure engine case 18 such that the tip 106 (e.g. shown as 106") passes through the high pressure engine case 18 is in fluid communication the combustor 24.

As shown in FIGS. 1 and 3, the main combustor 24 can be annular and can include an inner wall 124 and an outer wall 126 spaced radially apart from one another. Each of the main fuel injectors 145 can define a respective downstream facing spray cone 128. As shown in FIG. 4, the ignition jet flame axis B can extend from the outer wall 126 and passes within spray cones of at least two of the injectors 145. It is also possible that the ignition jet flame axis B extends from the outer wall 126 and passes within the spray cones 128 of at least two of the injectors 145 before intersecting either of the inner and outer walls 124,126. The tip 106 of the torch ignitor 10 can be mounted to the outer wall 126 of the combustor 24, for example as shown in FIG. 1.

A combustor dome wall 130 can join the inner and outer walls 124,126 of the main combustor 24, such that the main fuel injectors 145 can be mounted to the combustor dome wall 130. It is also possible that the tip 106 of the torch ignitor 10 can be mounted to the combustor dome wall 130 still so that the torch flame 110 enters the main combustor tangentially relative to an axial orientation of the main fuel injectors 145 (e.g. as shown as 106' in broken lines in FIG. 1).

It is also possible, such as shown in FIG. 4, that the torch ignitor 10 is a first torch ignitor and the system includes at least one additional torch ignitor 132 with a tangentially oriented ignition jet flame axis B' mounted to the combustor, circumferentially spaced apart from the first torch ignitor 10.

Figure 5:
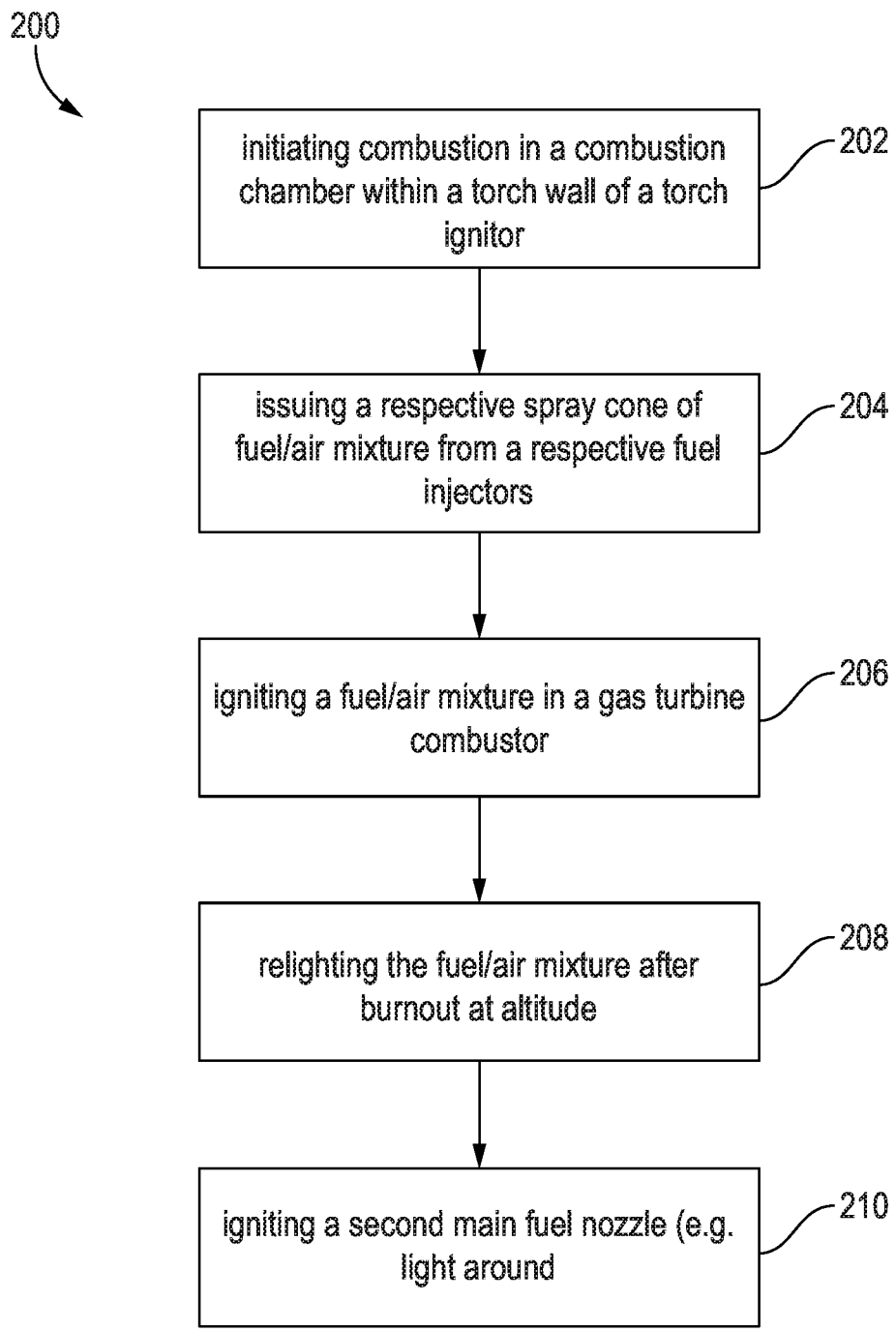
FIG. 5 is a block diagram of an example of a method for starting a turbine engine.

FIG. 5 shows a block diagram of a method 200 for starting a gas turbine engine, using a torch ignitor system as described above. At box 202, the method can include initiating combustion in a combustion chamber of a torch ignitor (such as in FIG. 1) to produce an ignition jet flame extending along an ignition jet flame axis (e.g. jet flame axis B and/or B'). Next, at box 204, the method can include issuing a respective spray cone 128 of a fuel/air mixture from a respective main fuel injector 145 in a plurality of main fuel injectors. At box 206, the method 200 can include igniting the fuel/air mixture in a gas turbine combustor (e.g. main combustor 24). Though boxes 204 and 206 are shown sequentially, it is contemplated that they may occur simultaneously. In operation, the ignition jet flame axis B and/or B' can intersect a plurality of the spray cones 128. At box 208, the method can include relighting the fuel/air mixture after burnout at altitude. When relighting at altitude, it may be needed to ignite a second main fuel injector 145 to assist in a light-around procedure, shown at box 210. In a light around, it is also possible to increase fuel flow to torch ignitor to assist in lighting the second main fuel injector. However, as would be appreciated by those skilled in the art, a light around procedure, and igniting a second main fuel nozzle, may also occur an at initial lighting of the main combustor as it increases up to idle, as well as relighting at altitude due to inadvertent flameout of the main combustor.

Discussion of Possible Embodiments

The following are non-exclusive descriptions of possible embodiments of the present disclosure.

An embodiment of a torch ignitor system for a combustor of a gas turbine engine includes a torch ignitor, the torch ignitor including a combustion chamber oriented about a torch axis, the combustion chamber having axially upstream and downstream ends defining a flow direction through the combustion chamber, along the axis. The torch ignitor includes a cap defining the axially upstream end of the combustion chamber and oriented about the axis, wherein the cap is configured to receive a fuel injector and at least one glow plug. The torch ignitor also includes an elbow connected to the downstream end of the combustion chamber for diverting combustion products along an ignition jet flame axis that is off of the torch axis.

The system of the preceding paragraph can optionally include, additionally and/or alternatively, any one or more of the following features, configurations and/or additional components:

A torch ignitor system for combustor of a gas turbine engine according to an exemplary embodiment of this disclosure, among other possible things, includes a tip at a downstream end of the elbow for issuing the injection of combustion products.

A further embodiment of any of the foregoing systems, wherein the ignition jet flame axis is off of the torch axis for tangential injection of combustion products into a gas turbine engine combustor.

A further embodiment of any of the foregoing systems, wherein the ignition jet flame axis is off of the torch axis for radial injection of combustion products into a gas turbine engine combustor.

A further embodiment of any of the foregoing systems, wherein the ignition jet flame axis is off of the torch axis for axial injection of combustion products into a gas turbine engine combustor.

A further embodiment of any of the foregoing systems, wherein the cap mounted to a high pressure engine case and the tip is mounted to a main combustor within the high pressure engine case for fluid communication of fuel and air from sources outside the high pressure engine case into the main combustor.

A further embodiment of the foregoing system can further comprise a fuel injector seat defined in the cap configured to receive a fuel injector and provide passage for injecting fuel and air from an external source through the injector into the combustion chamber, and at least one glow plug seat defined in the cap configured to receive a respective glow plug of the at least one glow plug through the cap and into the combustion chamber for initiating ignition in fuel and air in the combustion chamber.

A further embodiment of any of the foregoing systems, wherein the injector includes an air inlet and a separate fuel inlet, wherein the cap includes an air passage in fluid communication with the air inlet of the fuel injector and a liquid fuel passage in fluid communication with the fuel inlet of the fuel injector at the upstream end of the combustion chamber.

A further embodiment of any of the foregoing systems can further comprise a high pressure engine case, wherein the cap is mounted to an opening through the high pressure engine case, and a main combustor for generation of combustion products for gas turbine power, wherein the main combustor is defined about an engine axis, wherein the torch axis and engine axis are non-intersecting, and wherein the tip is connected to discharge combustion products into the combustor for ignition of a fuel/air mixture in the combustor.

A further embodiment of any of the foregoing systems can further comprise a plurality of main fuel injectors mounted to the main combustor, wherein the torch combustion chamber is outside of the main combustor, and wherein none of the main fuel injectors includes a combustion chamber outside of the main combustor.

A further embodiment of any of the foregoing systems, wherein the main combustor is annular and includes an inner wall and an outer wall spaced radially apart from one another, wherein each of the main fuel injectors defines a respective downstream facing spray cone, and wherein the ignition jet flame axis extends from the outer wall and passes within spray cones of at least two of the main fuel injectors.

A further embodiment of any of the foregoing systems, wherein the ignition jet flame axis extends from the outer wall and passes within the spray cones of at least two of the main fuel injectors.

A further embodiment of any of the foregoing systems, wherein the tip is mounted to the outer wall of the main combustor.

A further embodiment of any of the foregoing systems, wherein a combustor dome wall joins the inner and outer walls, wherein the main fuel injectors are mounted to the combustor dome wall, and wherein the tip of the torch ignitor is mounted to the combustor dome wall oriented tangentially relative to an axial orientation of the fuel injectors.

A further embodiment of any of the foregoing systems, wherein the torch axis and the engine axis are parallel.

A further embodiment of any of the foregoing systems, wherein the torch ignitor is a first torch ignitor and further comprising at least one additional torch ignitor with a tangentially oriented ignition jet flame axis mounted to the main combustor, circumferentially spaced apart from the first torch ignitor.

A further embodiment of any of the foregoing systems, wherein the combustion chamber is external to a high pressure engine case, and wherein the tip passes through the high pressure engine case and into the main combustor.

A further embodiment of any of the foregoing systems, wherein the torch ignitor further includes a plurality of helical cooling channels for fluid communication of high pressure air from an engine compressor with the combustion chamber.

An embodiment of a method includes initiating combustion in a combustion chamber of a torch ignitor to produce an ignition jet flame extending along an ignition jet flame axis, and igniting a fuel/air mixture in a gas turbine combustor by issuing a respective spray cone of the fuel/air mixture from a respective fuel injectors in a plurality of fuel injectors, wherein the ignition jet flame axis intersects a plurality of the spray cones.

The method of the preceding paragraph can optionally include relighting the fuel/air mixture after burnout at altitude.

A further embodiment of any of the preceding methods, wherein the ignition jet flame axis is tangential, radial, or axial relative to the engine axis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A torch ignitor system for a combustor of a gas turbine engine, the system comprising:
  a torch ignitor comprising:
    a combustion chamber oriented about a torch axis, the combustion chamber having axially upstream and downstream ends defining a flow direction through the combustion chamber, along the axis;

a cap defining the axially upstream end of the combustion chamber and oriented about the axis, wherein the cap is configured to receive a fuel injector and at least one glow plug;
an elbow connected to the downstream end of the combustion chamber for diverting combustion products along an ignition jet flame axis;
a tip at a downstream end of the elbow for issuing the injection of combustion products;
a main combustor for generation of combustion products for gas turbine power, wherein the main combustor is defined about an engine axis;
a plurality of main fuel injectors mounted to the main combustor, wherein the torch axis and engine axis are non-intersecting, wherein the tip is connected to discharge combustion products tangentially into the main combustor for ignition of a fuel/air mixture in the main combustor, wherein the ignition jet flame axis passes within the spray cones of at least two of the main fuel injectors.

2. The torch ignitor system as recited in claim 1, wherein the ignition jet flame axis is off of the torch axis for a radial component of injection of combustion products into a gas turbine engine combustor.

3. The torch ignitor system as recited in claim 1, wherein the ignition jet flame axis is off of the torch axis for an axial component of injection of combustion products into a gas turbine engine combustor.

4. The torch ignitor system as recited in claim 1, wherein the cap is mounted to a high pressure engine case and the tip is mounted to a main combustor within the high pressure engine case for fluid communication of fuel and air from sources outside the high pressure engine case into the main combustor.

5. The torch ignitor system as recited in claim 1, further comprising:
fuel injector seat defined in the cap configured to receive a fuel injector and provide passage for injecting fuel and air from an external source through the injector into the combustion chamber; and
at least one glow plug seat defined in the cap configured to receive a respective glow plug of the at least one glow plug through the cap and into the combustion chamber for initiating ignition in fuel and air in the combustion chamber.

6. The torch ignitor system as recited in claim 5, wherein the injector includes an air inlet and a separate fuel inlet, wherein the cap includes an air passage in fluid communication with the air inlet of the fuel injector and a liquid fuel passage in fluid communication with the fuel inlet of the fuel injector at the upstream end of the combustion chamber.

7. The torch ignitor system as recited in claim 1, further comprising:
a high pressure engine case, wherein the cap is mounted to an opening through the high pressure engine case.

8. The torch ignitor system as recited in claim 7, wherein the torch combustion chamber is outside of the main combustor, and wherein none of the main fuel injectors includes a combustion chamber outside of the main combustor.

9. The torch ignitor system as recited in claim 8, wherein the main combustor is annular and includes an inner wall and an outer wall spaced radially apart from one another, wherein each of the injectors defines a respective downstream facing spray cone, and wherein the ignition jet flame axis extends from the outer wall and passes within spray cones of at least two of the injectors.

10. The torch ignitor system as recited in claim 9, wherein the ignition jet flame axis extends from the outer wall.

11. The torch ignitor system as recited in claim 8, wherein the tip is mounted to the outer wall of the main combustor.

12. The torch ignitor system as recited in claim 8, wherein a combustor dome wall joins the inner and outer walls, wherein the main fuel injectors are mounted to the combustor dome wall, and wherein the tip of the torch ignitor is mounted to the combustor dome wall oriented tangentially relative to an axial orientation of the fuel injectors.

13. The torch ignitor system as recited in claim 7, wherein the torch axis and the engine axis are parallel.

14. The torch ignitor system as recited in claim 7, wherein the torch ignitor is a first torch ignitor and further comprising at least one additional torch ignitor with a tangentially oriented ignition jet flame axis mounted to the main combustor, circumferentially spaced apart from the first torch ignitor.

15. The torch ignitor system as recited in claim 1, wherein the combustion chamber is external to a high pressure engine case, and wherein the tip passes through the high pressure engine case and into the main combustor.

16. The torch ignitor system as recited in claim 1, wherein the torch ignitor further includes a plurality of helical cooling channels for fluid communication of high pressure air from an engine compressor with the combustion chamber.

17. A method comprising:
initiating combustion in a combustion chamber of a torch ignitor to produce an ignition jet flame extending along an ignition jet flame axis; and
igniting a fuel/air mixture in a gas turbine combustor, wherein the gas turbine combustor is defined about an engine axis, by issuing a respective spray cone of the fuel/air mixture from a respective main fuel injectors in a plurality of main fuel injectors of the gas turbine combustor, wherein the ignition jet flame axis is tangential to the engine axis and intersects a plurality of the spray cones, wherein the torch axis and engine axis are non-intersecting.

18. The method as recited in claim 17, wherein igniting the fuel/air mixture in the gas turbine engine includes relighting the fuel/air mixture after burnout at altitude.

19. The method as recited in claim 17, wherein the ignition jet flame axis has a component that is tangential, radial, or axial relative to an engine axis.

* * * * *